United States Patent
Zhu et al.

(10) Patent No.: US 11,803,254 B2
(45) Date of Patent: Oct. 31, 2023

(54) FLEXIBLE DISPLAY APPARATUS AND CONTROL METHOD THEREFOR

(71) Applicants: Chengdu BOE Optoelectronics Technology Co., Ltd., Sichuan (CN); BOE Technology Group Co., Ltd., Beijing (CN)

(72) Inventors: Hong Zhu, Beijing (CN); Xiaolin Liu, Beijing (CN); Chao Sun, Beijing (CN); Yuanjie Li, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 53 days.

(21) Appl. No.: 17/631,484

(22) PCT Filed: Mar. 9, 2021

(86) PCT No.: PCT/CN2021/079716
§ 371 (c)(1),
(2) Date: Jan. 30, 2022

(87) PCT Pub. No.: WO2021/218398
PCT Pub. Date: Nov. 4, 2021

(65) Prior Publication Data
US 2022/0276724 A1    Sep. 1, 2022

(30) Foreign Application Priority Data
Apr. 28, 2020   (CN) .................. 202010352350.X (51) Int. Cl.
*G09G 5/00*   (2006.01)
*G06F 3/03*   (2006.01)
(Continued)

(52) U.S. Cl.
CPC .............. *G06F 3/03* (2013.01); *G01B 7/18* (2013.01); *G06F 1/1652* (2013.01)

(58) Field of Classification Search
CPC .... G06F 1/1652; G06F 1/1677; G06F 1/1681; G06F 1/1694; G06F 3/03; G09G 2380/02; G09F 9/301; G01B 7/18; G01D 5/16
See application file for complete search history.

(56) References Cited

U.S. PATENT DOCUMENTS

| | | | |
|---|---|---|---|
| 10,423,249 B2 * | 9/2019 | Xu ........................ | G06F 3/041 |
| 2004/0008191 A1 * | 1/2004 | Poupyrev .............. | G06F 3/0487 |
| | | | 345/184 |

(Continued)

FOREIGN PATENT DOCUMENTS

| | | |
|---|---|---|
| CN | 102436784 A | 5/2012 |
| CN | 103197879 A | 7/2013 |

(Continued)

OTHER PUBLICATIONS

CN202010352350.X first office action, dated Aug. 20, 2021, 13 pages.

(Continued)

*Primary Examiner* — Joe H Cheng
(74) *Attorney, Agent, or Firm* — IPRO, PLLC (57) ABSTRACT

A flexible display apparatus and a control method therefor. The flexible display apparatus comprises: a flexible display panel (10); a bending sensor (11), that is configured to sense bending information of the flexible display panel (10); and a processor, that is coupled to the bending sensor (11), configured to receive the bending information of the bending sensor (11), and determines whether the bending information is valid bending information, and if so, then a currently running application program is controlled according to the valid bending information to perform a corresponding operation. By bending the flexible display panel (10), an (Continued)

application program is controlled to perform a corresponding operation, achieving a convenient, accurate, and effective operation, and improving user experience.

20 Claims, 5 Drawing Sheets (51) Int. Cl.
*G01B 7/16* (2006.01)
*G06F 1/16* (2006.01)

(56) References Cited

U.S. PATENT DOCUMENTS

| | | | |
|---|---|---|---|
| 2010/0060548 A1* | 3/2010 | Choi | H04M 1/0268 345/1.3 |
| 2012/0038613 A1 | 2/2012 | Choi | |
| 2013/0169562 A1 | 7/2013 | Cho et al. | |
| 2013/0176248 A1 | 7/2013 | Shin et al. | |
| 2013/0265257 A1* | 10/2013 | Jung | G06F 3/0416 345/173 |
| 2014/0015743 A1* | 1/2014 | Seo | G06F 3/017 345/156 |
| 2014/0085230 A1* | 3/2014 | Sato | G06F 3/0484 345/173 |
| 2014/0118910 A1 | 5/2014 | Sung et al. | |
| 2016/0357221 A1 | 12/2016 | Huh | |
| 2020/0371604 A1 | 11/2020 | Li et al. | |

FOREIGN PATENT DOCUMENTS

| | | | | |
|---|---|---|---|---|
| CN | 204347753 U | | 5/2015 | |
| CN | 107170375 A | | 9/2017 | |
| CN | 107835321 A | * | 3/2018 | ......... G06F 3/04817 |
| CN | 108089798 A | | 5/2018 | |
| CN | 109491506 A | | 3/2019 | |
| CN | 110570771 A | | 12/2019 | |
| CN | 110764576 A | | 2/2020 | |
| CN | 111583789 A | | 8/2020 | |

OTHER PUBLICATIONS

CN202010352350.X Decision of Rejection, dated Feb. 23, 2022, 17 pages.

* cited by examiner

FLEXIBLE DISPLAY APPARATUS AND CONTROL METHOD THEREFOR

CROSS REFERENCE TO RELATED APPLICATIONS

This application is a national phase entry under 35 U.S.C. § 371 of International Application No. PCT/CN2021/079716, filed on Mar. 9, 2021, which claims priority of Chinese Patent Application No. 202010352350.X, filed with the China National Intellectual Property Administration (CNIPA) on Apr. 28, 2020, and entitled "DISPLAY PANEL AND DISPLAY DEVICE", the entire content of which is incorporated herein by reference.

FIELD

The present disclosure relates to the technical field of display, in particular to a flexible display apparatus and a control method thereof.

BACKGROUND

With the continuous development of display technology, more and more display devices are widely used in people's daily life and work. A flexible display apparatus has the advantages of being light, thin, foldable, etc., and can be used and stored in various forms, thereby being more and more popular among people.

However, for the flexible display apparatus, some operation manners, such as swiping or clicking to answer a call, and some fixed button operations or the like have the problems of being not convenient or easy to execute.

SUMMARY

A flexible display apparatus provided by an embodiment of the present disclosure, includes:
a flexible display panel;
a bending inductor, configured to sense bending information of the flexible display panel; and
a processor, coupled with the bending inductor, and configured to receive the bending information of the bending inductor, determine whether the bending information is valid bending information, and if so, control a currently running application to execute a corresponding operation according to the valid bending information.

Optionally, in embodiments of the present disclosure, the bending information includes a degree of bending.

The bending inductor includes: at least one strain gauge in a bending induction region of the flexible display panel, and a bending sensor coupled with the strain gauge.

One end of the strain gauge is coupled with a power supply terminal, and the other end of the strain gauge is coupled with the bending sensor.

The bending sensor is configured to detect current signals of the strain gauge, determine the degree of bending according to the current signals, and output the bending information.

Optionally, in embodiments of the present disclosure, the strain gauge is attached to a surface of the flexible display panel; or the strain gauge is integrated inside the flexible display panel.

Optionally, in embodiments of the present disclosure, the strain gauge is of a strip structure, and the strain gauge intersects a bending datum line of the flexible display panel.

Optionally, in embodiments of the present disclosure, the bending information further includes a bending direction.

The bending inductor further includes: at least two first resistance structures, and at least two second resistance structures respectively corresponding to positions of the first resistance structures.

The first resistance structures and the second resistance structures are in the bending induction region, the first resistance structures are on one side of the flexible display panel, and the second resistance structures are on the other side of the flexible display panel.

Optionally, in embodiments of the present disclosure, the first resistance structures are arranged in a direction intersecting a bending datum line of the flexible display panel, and there are two first resistance structures respectively coupled with the power supply terminal and the bending sensor; the second resistance structures are arranged in the direction intersecting the bending datum line of the flexible display panel, and there are two second resistance structures respectively coupled with the power supply terminal and the bending sensor.

When the flexible display panel is in a flat state, adjacent first resistance structures are insulated from each other, and adjacent second resistance structures are insulated from each other.

When the flexible display panel is in a bent state, there are adjacent first resistance structures being in direct contact and are coupled; or, there are adjacent second resistance structures being in direct contact and are coupled.

The bending sensor is configured to detect current signals of the first resistance structures or the second resistance structures, and determine the bending direction according to the current signals.

Optionally, in embodiments of the present disclosure, the first resistance structures and the second resistance structures are each of a strip-shaped structure; and extension directions of the first resistance structures and the second resistance structures are both consistent with a direction of the bending datum line of the flexible display panel.

Optionally, in embodiments of the present disclosure, the flexible display apparatus further includes: a flexible battery on a side, facing away from a display surface, of the flexible display panel.

Optionally, in embodiments of the present disclosure, the flexible display apparatus further includes: a flexible shell.

The flexible display panel and the flexible battery are inside the flexible shell.

Correspondingly, embodiments of the present disclosure further provide a control method of the above flexible display apparatus, including:
receiving bending information of a bending inductor; and
determining whether the bending information is valid bending information, and if so, controlling a currently running application to execute a corresponding operation according to the valid bending information.

Optionally, in embodiments of the present disclosure, the determining whether the bending information is valid bending information includes:
comparing a degree of bending in the bending information with a preset threshold, and
if the degree of bending is less than the preset threshold, the bending information is invalid bending information; and if the degree of bending is greater than the preset threshold, the bending information is valid bending information.

Optionally, in embodiments of the present disclosure, the controlling the currently running application to execute the corresponding operation according to the valid bending information includes:

triggering, when it is determined that the currently running application is an application matching a bending event and the valid bending information meets a corresponding trigger condition, the application to execute the corresponding operation.

DETAILED DESCRIPTION OF THE EMBODIMENTS

In view of the problem that some operation manners of a flexible display apparatus are not convenient or easy to implement, embodiments of the present disclosure provide a flexible display apparatus and a control method thereof.

Specific implementations of the flexible display apparatus and the control method thereof provided by the embodiments of the present disclosure will be described in detail below with reference to drawings. The size and shape of each component in the drawings do not reflect the true scale, and are only intended to illustrate the present disclosure.

Figure 1:
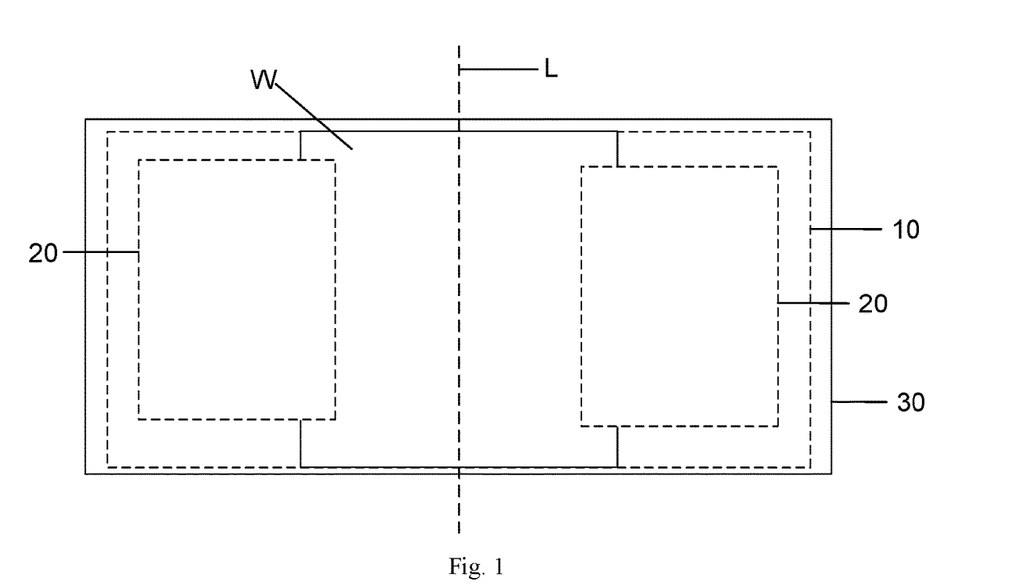
FIG. 1 is a schematic top view of a flexible display apparatus provided by an embodiment of the present disclosure.
Figure 2:
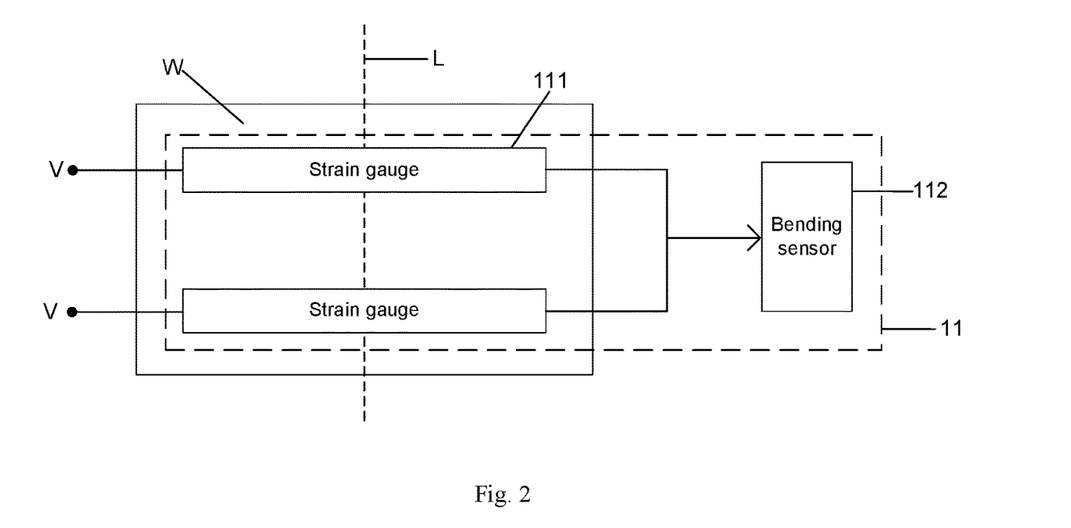
FIG. 2 is a first structural schematic diagram of a bending inductor in an embodiment of the present disclosure.

FIG. 1 is a schematic top view of a flexible display apparatus provided by an embodiment of the present disclosure. FIG. 2 is a schematic structural diagram of a bending inductor in an embodiment of the present disclosure. As shown in FIG. 1 and FIG. 2, the flexible display apparatus provided by embodiments of the present disclosure includes:

a flexible display panel 10;

a bending inductor 11, configured to sense bending information of the flexible display panel 10; and a processor (not shown in the figures), coupled with the bending inductor 11, and configured to receive the bending information of the bending inductor 11, judge whether the bending information is valid bending information, and if so, control a currently running application to execute a corresponding operation according to the valid bending information.

In the flexible display apparatus provided by the embodiments of the present disclosure, by providing the bending inductor, the bending information of the flexible display panel can be sensed, and the processor can control the currently running application to execute a response operation according to the valid bending information, so that the application can be controlled to execute the corresponding operation by bending the flexible display panel, realizing convenient, accurate, and effective operations, and improving user experience.

In the flexible display apparatus in embodiments of the present disclosure, the flexible display panel is made of a flexible material, or the flexible display panel has a flexible structure, so that the flexible display apparatus may be bent or folded. The flexible display apparatus may be applied to any products or components with display functions such as mobile phones, tablet computers, televisions, monitors, notebook computers, digital photo frames and navigators.

In implementations, a bending induction region W may be any enclosed region in the flexible display apparatus, and a bending datum line L may be any straight line parallel to a surface of the flexible display apparatus. The bending induction region W and the bending datum line L may be set in the flexible display apparatus in accordance with a shape of the flexible display apparatus and a user's operating habits. Applications responding to a bending operation of the flexible display panel may be preset. For example, a telephone program may be set to respond to the bending operation of the flexible display panel. When the user executes the bending operation on the flexible display panel, the bending inductor may sense the bending information of the flexible display panel, and when the processor judges that the bending information is valid bending information, the telephone program may be controlled to execute an operation of answering or hanging up.

In the flexible display apparatus provided by the embodiments of the present disclosure, the bending information may include a degree of bending.

As shown in FIG. 2, the bending inductor 11 may include: at least one strain gauge 111 in the bending induction region W of the flexible display panel, and a bending sensor 112 coupled with each of the strain gauges 111.

One end of the strain gauge 111 is coupled with a power supply terminal V, and the other end of the strain gauge 111 is coupled with the bending sensor 112.

The bending sensor 112 is configured to detect current signals of the strain gauge(s) 111, determine the degree of bending according to the current signals, and output the bending information.

The above degree of bending may be understood as the amplitude of bending in a bending direction, for example, an angle, between a part of the flexible display panel on one side of the bending datum line and the other part of the flexible display panel on the other side of the bending datum line, may be used to indicate the degree of bending. The angle is larger than 0 and smaller than 180.

One end of the strain gauge(s) 111 is coupled with the power supply terminal V, and the other end of the strain gauge(s) 111 is coupled with the bending sensor 112. Before the flexible display apparatus is bent, a current passing through the strain gauge(s) 111 and received by the bending sensor 112 is $I_0$. When the flexible display apparatus is bent, resistance of the strain gauge(s) 111 changes, and a current passing through the strain gauge(s) 111 and received by the bending sensor 112 is $I_1$. Thus, the degree of bending of the strain gauge(s) 111 may be expressed as $I_1 - I_0$.

In FIG. 2, the bending inductor 11 includes two strain gauges 111 as an example for illustration. In implementations, the bending inductor 11 may also include more strain gauges 111, or the bending inductor 11 may also include only one strain gauge 111, and the quantity of the strain gauges 111 is not limited here. When the bending inductor 11 includes at least two strain gauges 111, if the bending sensor 112 detects out that the current signal of at least one strain gauge 111 changes, it may determine that the flexible display panel is bent, and the bending information may be output.

In the flexible display apparatus provided by embodiments of the present disclosure, the strain gauge(s) may be set in the following manners.

Manner 1: The strain gauge(s) may be attached to a surface of the flexible display panel. For example, the strain gauge(s) may be attached to a display surface of the flexible display panel, or a side, facing away from the display surface, of the flexible display panel. In the manufacturing process, the strain gauge(s) only need to be attached to the surface of the flexible display panel, and the manufacturing process is simple.

Manner 2: the strain gauge(s) may be integrated inside the flexible display panel, so the integration level of the flexible display apparatus may be improved.

In implementations, in the flexible display apparatus provided by embodiments of the present disclosure, as shown in FIG. 2, the strain gauge 111 is of a strip structure, and the strain gauge 111 crosses the bending datum line L of the flexible display panel. Since the resistance of the strain gauge 111 is related to a length and a cross-sectional area of the strain gauge 111, by setting the strain gauge 111 to be of the strip structure, when the flexible display panel is bent, the resistance of the strain gauge 111 is more likely to change, thereby making the bending inductor 11 more sensitive.

Figure 3:
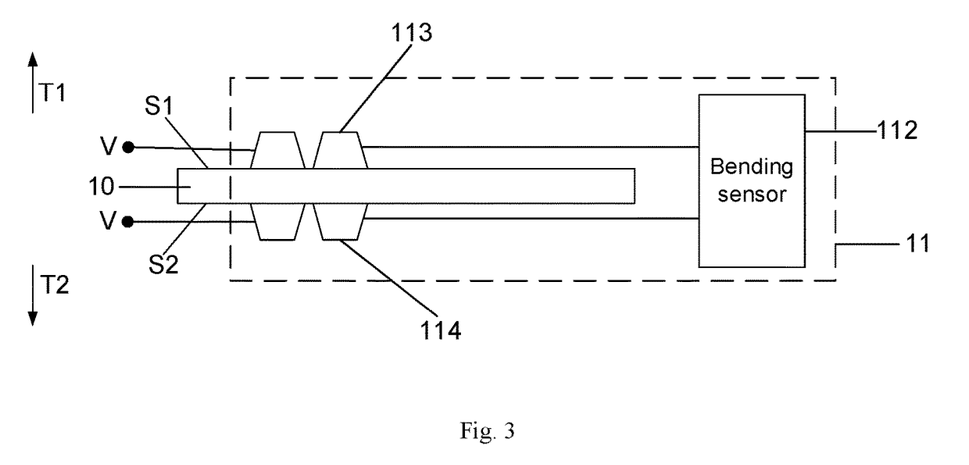
FIG. 3 is a second structural schematic diagram of a bending inductor in an embodiment of the present disclosure.

In implementations, in the flexible display apparatus provided by embodiments of the present disclosure, the bending information may further include a bending direction. The bending direction may be divided into an inward bending direction and an outward bending direction. Referring to FIG. 3, taking a first surface S1 of the flexible display panel 10 being the display surface as an example, the inward bending direction may refer to bending the flexible display panel 10 in a direction shown by an arrow T1 in the figure, namely, bending the flexible display panel 10 toward the first surface S1, and the outward bending direction may refer to bending the flexible display panel 10 in a direction indicated by an arrow T2 in the figure, namely, bending the flexible display panel 10 toward a second surface S2.

FIG. 3 is a schematic cross-sectional view of the flexible display panel at the bending induction region. As shown in FIG. 3, the bending inductor 11 may further include: at least two first resistive structures 113, and at least two second resistance structures 114 respectively corresponding to positions of the first resistance structures 113.

The first resistance structures 113 and the second resistance structures 114 are located in the bending induction region. The first resistance structures 113 are located on one side of the flexible display panel 10. For example, the first resistance structures 113 are located on the first surface S1 of the flexible display panel 10. The second resistance structures 114 are located on the other side of the flexible display panel 10. For example, the second resistance structures 114 are located on the second surface S2 of the flexible display panel 10. In embodiments of the present disclosure, by correspondingly disposing the first resistance structures 113 and the second resistance structures 114 on both sides of the flexible display panel 10, the bending direction of the flexible display panel 10 may be sensed.

Figure 5:
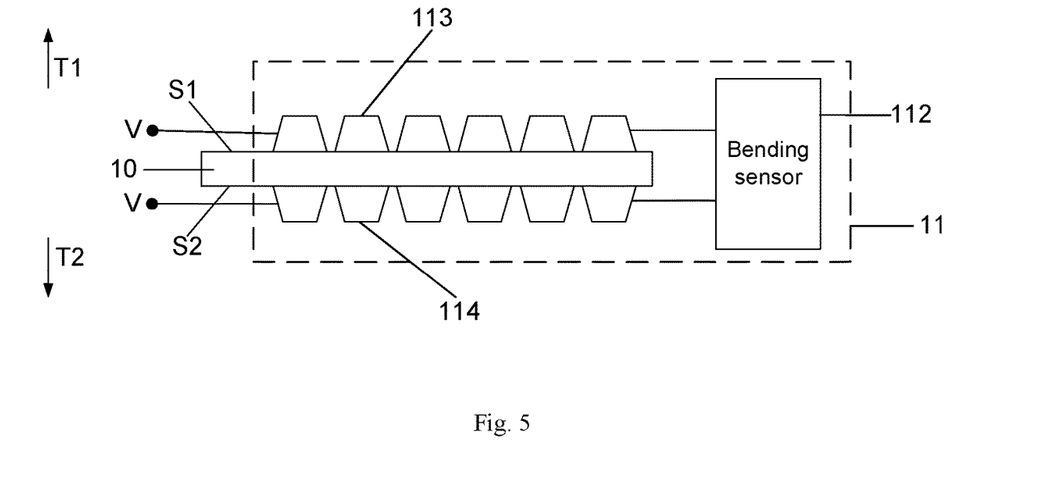
FIG. 5 is a third structural schematic diagram of a bending inductor in an embodiment of the present disclosure.

FIG. 3 takes the bending inductor 11 that includes two first resistance structures 113 and two second resistance structures 114 as an example for illustration. In implementations, the bending inductor 11 may also include more first resistance structures 113 and second resistance structures 114, as shown in FIG. 5. FIG. 5 shows a case where the bending inductor 11 includes more first resistance structures 113 and second resistance structures 114.

Figure 6:
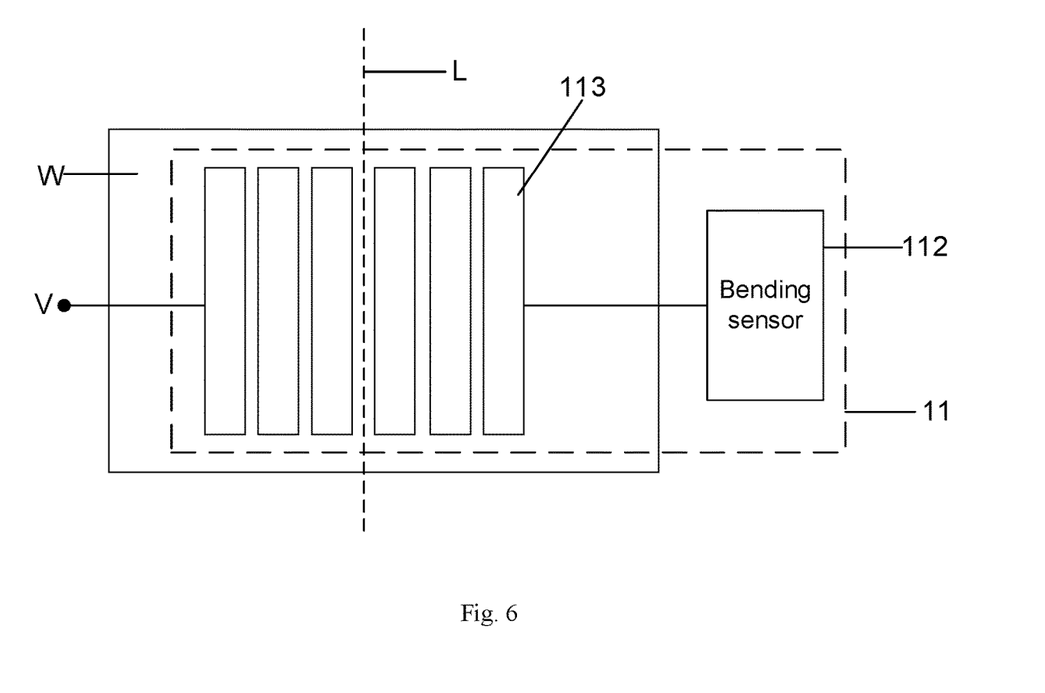
FIG. 6 is a schematic top view of a bending inductor in an embodiment of the present disclosure.

FIG. 6 shows a schematic distribution diagram of the first resistance structures 113 corresponding to FIG. 5. As shown in FIG. 6, in the flexible display apparatus provided by embodiments of the present disclosure, the first resistance structures 113 are arranged in a direction intersecting the bending datum line L of the flexible display panel, and there are two first resistance structures 113 respectively coupled with the power supply terminal V and the bending sensor 112. Similarly, the second resistance structures are arranged in the direction intersecting the bending datum line of the flexible display panel, and there are two second resistance structures respectively coupled with the power supply terminal and the bending sensor.

As shown in FIG. 3, the flexible display panel 10 is in a flat state, adjacent first resistance structures 113 are insulated from each other, and adjacent second resistance structures 114 are insulated from each other.

Figure 4:
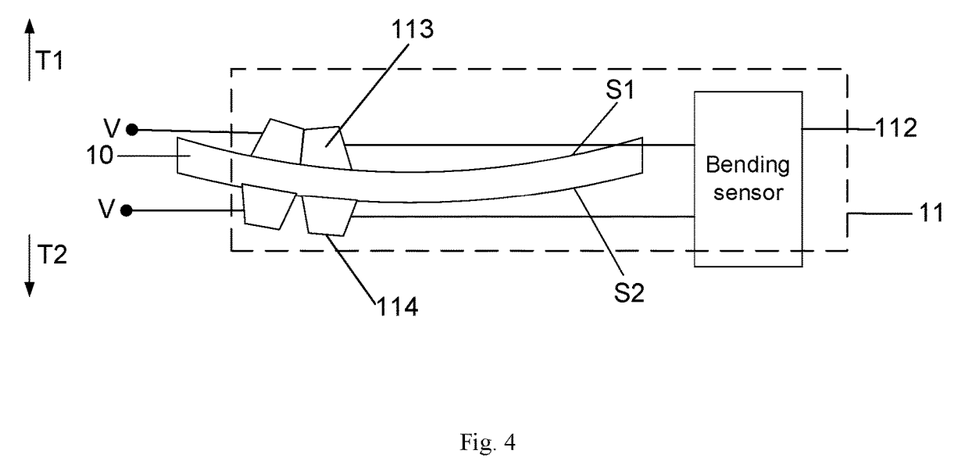
FIG. 4 is a schematic cross-sectional view of a flexible display panel after being bent toward one side in a first direction.

FIG. 4 is a schematic cross-sectional view of the flexible display panel 10 after being bent toward one side in a first direction T1. As shown in FIG. 4, the flexible display panel 10 is in a bent state, there are adjacent first resistance structures 113 that are in direct contact and are coupled; or, when the flexible display panel 10 is in a bent state, there are adjacent second resistance structures that are in direct contact and are coupled.

The bending sensor 112 is configured to detect current signals of the first resistance structures 113 or the second resistance structures 114, and determine the bending direction according to the current signals.

In embodiments of the present disclosure, at least two first resistance structures 113 are disposed on one side of the flexible display panel 10, and at least two second resistance structures 114 are disposed on the other side of the flexible display panel 10. As shown in FIG. 3, when the flexible display panel 10 is in the flat state, the adjacent first resistance structures 113 are insulated from each other, and the adjacent second resistance structures 114 are insulated from each other, so the bending sensor 112 may not receive a current.

As shown in FIG. 4, the flexible display panel 10 is in the bent state. In FIG. 4, as an example, the flexible display panel 10 is bent toward the first direction T1. The flexible display panel 10 is bent, so the adjacent first resistance structures 113 are in direct contact and are coupled, the bending sensor 112 may receive a current signal, and the adjacent second resistance structures 114 still keep insulated. Similarly, if the flexible display panel 10 is bent toward a second direction T2, the adjacent second resistance structures 114 may be in direct contact and be coupled, and the adjacent first resistance structures 113 keep insulated. Therefore, the bending sensor 112 may only receive a current signal from one side, and the bending sensor 112 may determine the bending direction of the flexible display panel according to the received current signal.

In implementations, the bending direction may be represented by setting an output value of the bending sensor 112.

For example, when the bending sensor 112 receives a current signal corresponding to the first resistance structures 113, the bending sensor 112 may be set to output a positive number, and when the bending sensor 112 receives a current signal corresponding to the second resistance structures 114, the bending sensor 112 may be set to output a negative number, so as to facilitate identifying the bending direction.

As shown in FIG. 3, in order to ensure that only adjacent resistance structures on a certain side are in direct contact and coupled after the flexible display panel 10 is bent, positions of the second resistance structures 114 need to be set to correspond to the positions of the first resistance structures 113 respectively. For example, a size of the second resistance structure 114 may be set to be approximately the same as that of the first resistance structure 113, and the position of the second resistance structure 114 is approximately the same as that of the corresponding first resistance structure 113. The sizes and positions of the first resistance structure 113 and the second resistance structure 114 may vary within certain deviations without affecting a detection structure of the bending inductor 11.

In addition, in order to make the adjacent first resistance structures 113 (or the adjacent second resistance structures 114) be in direct contact and be coupled more easily after the flexible display panel 10 is bent, the first resistance structures 13 may be configured as: in the direction shown by the arrow T1, a cross-sectional area of the first resistance structure 113 gradually decreases, and in the direction shown by the arrow T2, a cross-sectional area of the second resistance structure 114 gradually decreases.

In implementations, in the flexible display apparatus provided by embodiments of the present disclosure, referring to FIG. 6, the first resistance structures 113 and the second resistance structures 114 are each of a strip-shaped structure, and extension directions of the first resistance structures 113 and the second resistance structures 114 are consistent with a direction of the bending datum line L of the flexible display panel. In this way, when the flexible display panel is bent along the bending datum line L, only some adjacent resistance structures on one side may be in direct contact and be coupled, so as to ensure the accuracy of the bending direction detected by the bending inductor 11.

In addition, in order to improve the integration level of the flexible display apparatus, the resistance structures on the display surface may be integrated into the flexible display panel, and the resistance structures on the other side may be attached to the surface of the flexible display panel. In order to prevent the resistance structures from affecting a display effect, the resistance structures may be disposed in a non-display region, or the resistance structures are made of a transparent material. In order to avoid affecting a detection result of the strain gauge(s), the resistance structures and the strain gauge(s) in the bending inductor are insulated from each other.

In implementations, when the degree of bending of the flexible display panel is small, the bending inductor may also detect out the bending information of the flexible display panel, but this situation may not meet a user's expectations. That is, bending of the flexible display panel may be caused by maloperation. Thus, whether the bending information is valid bending information needs to be judged by the processor, so as to prevent unnecessary operations due to maloperation. For example, the degree of bending in the bending information may be compared with a preset threshold. If the degree of bending is greater than the preset threshold, the bending information is valid bending information; otherwise, the bending information is invalid bending information. When the processor determines that the received bending information is invalid bending information, the bending information may be discarded.

In embodiments of the present disclosure, the bending inductor may detect the degree of bending and the bending direction of the flexible display panel. Therefore, the processor may determine the bending state of the flexible display panel according to the bending information received within a certain period of time. Taking bending directions received in a certain period of time being $F_1, F_2, \ldots, F_n$, degrees of bending received in the certain period of time being $P_1, P_2, \ldots, P_n$, and the preset threshold being K as an example, where n is greater than and equal to 2 and indicates the quantity of bending information recorded, if $F_1=F_2=\ldots=F_n$, and $K<P_1<P_2<\ldots<P_n$, the state of the flexible display panel may be determined as being bent towards one side, and if $F_1=F_2=\ldots=F_n$, and $P_n<K<\ldots<P_1$, the state of the flexible display panel may be determined as a bending restore state, namely a state restoring from the bent state to the flat state.

In implementations, corresponding functions may be realized through different bending states. For example, an operation of answering a call may be executed when the flexible display panel is bent toward the display surface, or an operation of turning off an alarm clock may be executed when the flexible display panel is bent toward the side facing away from the display surface. This is only an example for illustration, and does not limit specific operations executed by applications under control of the processor.

In implementations, in some cases, the processor may further determine whether the currently running application meets an execution condition. If so, the processor controls the application to execute the corresponding operation, or, the processor discards the bending information. Taking the currently running application being an alarm clock as an example, an execution condition of the alarm clock may be set as: the alarm clock is in a ringing state, and when the user bends the flexible display panel, the processor may control the alarm clock to execute the operation of turning off the alarm clock.

Taking the currently running application being a phone program as an example, an execution condition of the phone program may be set as: the phone program is in a ringing or busy state, and when the processor receives valid bending information and determines that the phone program is in the ringing state, the processor may control the phone program to execute the operation of answering a call. During the user being on the call, the flexible display panel may keep the bent state. When the processor receives valid bending information again, for example, the flexible display panel is in the bending restore state, and the processor determines that the phone program is in the busy state, the processor may control the phone program to execute the operation of hanging up.

In addition, the processor may also control a selection operation of a prompt window of an application. For example, an interface of the prompt window may display options of "Yes" and "No", a condition for the application to execute the option "Yes" may be set as: the bending direction of the flexible display panel is the inward bending direction, and a condition for the application to execute the option "No" may be set as: the bending direction of the flexible display panel is the outward bending direction. When the application displays the prompt window, if the processor receives the valid bending information, and determines that the bending direction in the bending information is the inward bending direction, the processor may control the application to execute the option "Yes", and if the processor determines that the bending direction in the bending information is the outward bending direction, the processor may control the application to execute the option "No".

In implementations, see FIG. 1, the flexible display apparatus provided by embodiments of the present disclosure may further include: a flexible battery 20 located on the side, facing away from the display surface, of the flexible display panel 10. For example, the flexible battery may be made of a flexible material, or the flexible battery 20 may have a flexible structure. The flexible battery 20 may provide a power supply for the flexible display panel 10.

In implementations, see FIG. 1, the flexible display apparatus provided by embodiments of the present disclosure may further include: a flexible shell 30.

The flexible display panel 10 and the flexible battery 20 are located inside the flexible shell 30.

For example, the flexible shell 30 may be made of a flexible material, and by disposing the flexible display panel 10 and the flexible battery 20 inside the flexible shell 30, the flexible display apparatus may be bent or folded.

Based on the same inventive concept, embodiments of the present disclosure further provide a control method of the above flexible display apparatus. Since the principle of the control method to solve the problem is similar to that of the above flexible display apparatus, the implementation of the control method may refer to the implementation of the above flexible display apparatus, which will not be repeated here.

Figure 7:
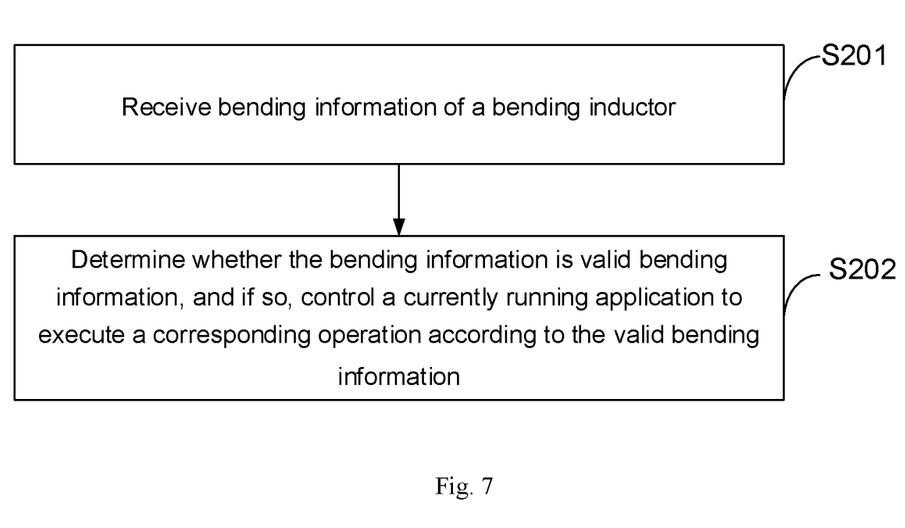
FIG. 7 is a flowchart of a control method of the above flexible display apparatus provided in an embodiment of the present disclosure.

The control method of the above flexible display apparatus provided by embodiments of the present disclosure, as shown in FIG. 7, comprises the following operations.

S201, bending information of a bending inductor is received.

S202, whether the bending information is valid bending information is judged, and if so, a currently running application is controlled to execute a corresponding operation according to the valid bending information.

The control method of the flexible display apparatus provided by the embodiments of the present disclosure can control the currently running application to execute the corresponding operation according to the valid bending information, so the application can be controlled to execute the corresponding operation through bending of a flexible display panel, realizing convenient, accurate and effective operation and improving user experience.

Figure 8:
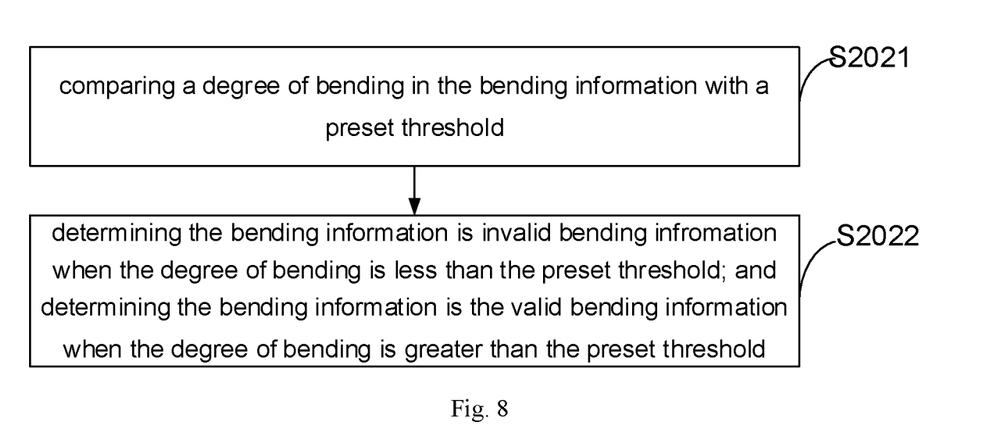
FIG. 8 is a flowchart of judging whether bending information is valid bending information.

In implementations, see FIG. 8, in the control method provided by embodiments of the present disclosure, in operation S202, judging whether the bending information is valid bending information may include:

S2021: a degree of bending in the bending information is compared with a preset threshold; and S2022: If the degree of bending is less than the preset threshold, the bending information is invalid bending information, and if the degree of bending is greater than the preset threshold, the bending information is valid bending information.

When the degree of bending of the flexible display panel is small, the bending inductor may also detect out the bending information of the flexible display panel, but this situation may not meet a user's expectations. That is, bending of the flexible display panel may be caused by maloperation. Thus, whether the bending information is valid bending information needs to be judged by a processor, so as to prevent unnecessary operations due to maloperation. By comparing the bending information with the preset threshold, invalid bending information may be removed, and maloperation may be avoided. In implementations, the preset threshold may be set according to actual needs, for example, if bending with a bending angle of less than 2° is regarded as maloperation, a degree of bending corresponding to the bending angle may be used as the preset threshold.

Figure 9:
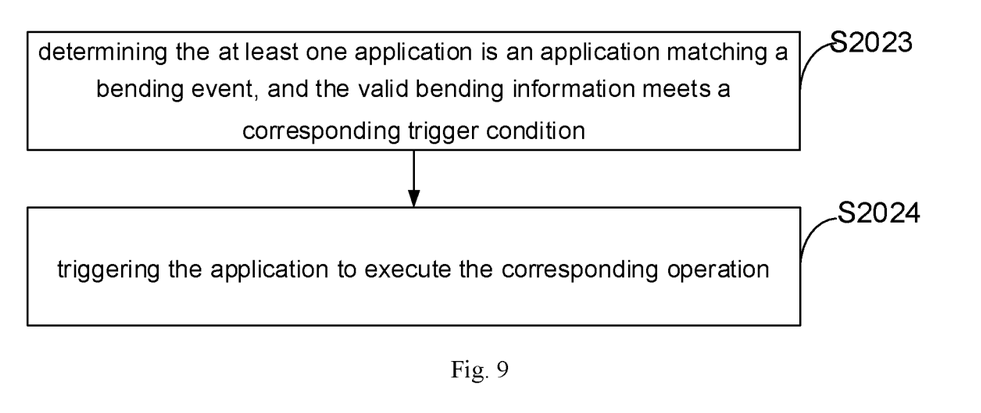
FIG. 9 is a flowchart of controlling a currently running application program to execute a corresponding operation according to valid bending information.

In implementations, see FIG. 9, in the control method provided by embodiments of the present disclosure, in operation S202 above, controlling the currently running application program to execute the corresponding operation according to the valid bending information includes:

S2023: determining the currently running application is an application matching a bending event, and the valid bending information meets a corresponding trigger condition;

S2024: triggering the application to execute the corresponding operation.

In implementations, applications that match the bending event may be preset, that is, applications that realize corresponding operations through the bending event are preset. For example, phone programs, schedule reminders and other applications may be set to match the bending event. When receiving the valid bending information, the processor judges whether the currently running application is the application matching the bending event, and if so, controls the application to execute the corresponding operation.

In addition, in implementations, in some cases, the processor may also judge whether the currently running application meets an execution condition, and if so, control the application to execute the corresponding operation, otherwise, the processor discards the bending information. Taking the currently running application being an alarm clock as an example, the execution condition of the alarm clock may be set as: a state of the alarm clock is a ringing state, and when the user bends the flexible display panel, the processor may control the alarm clock to execute an operation of turning off the alarm clock.

According to the flexible display apparatus and the control method thereof provided by the embodiments of the present disclosure, by providing the bending inductor, the bending information of the flexible display panel can be sensed, and the processor can control the currently running application to execute a response operation according to the valid bending information, so that the application can be controlled to execute the corresponding operation through bending of the flexible display panel, realizing convenient, accurate, and effective operations, and improving the user experience.

It will be apparent to those skilled in the art that various modifications and variations can be made in the present disclosure without departing from the spirit or scope of the present disclosure. Thus, it is intended that the present disclosure cover the modifications and variations of the present disclosure provided they come within the scope of the appended claims and their equivalents.

What is claimed is:

1. A flexible display apparatus, comprising:
a flexible display panel;
a bending inductor, configured to sense bending information of the flexible display panel; and
a processor, coupled with the bending inductor, and configured to:
receive the bending information of the bending inductor,
determine whether the bending information is valid bending information, and
control at least one application to execute a corresponding operation according to the valid bending information, when the bending information is determined to be the valid bending information;
wherein the bending information comprises a degree of bending;
the bending inductor comprises:
at least one strain gauge in a bending induction region of the flexible display panel, and
a bending sensor coupled with the at least one strain gauge;
wherein one end of the strain gauge is coupled with a power supply terminal, and the other end of the strain gauge is coupled with the bending sensor; and
the bending sensor is configured to:
detect current signals of the strain gauge,
determine the degree of bending according to the current signals, and
output the bending information.

2. The flexible display apparatus according to claim 1, wherein:
the strain gauge is attached to:
a surface of the flexible display panel; or
a surface of the flexible display apparatus; or
the strain gauge is integrated inside:
the flexible display panel; or
the flexible display apparatus.

3. The flexible display apparatus according to claim 1, wherein the strain gauge is of a strip structure, and intersects a bending datum line of the flexible display panel.

4. The flexible display apparatus according to claim 1, wherein the bending information further comprises a bending direction;
the bending inductor further comprises:
at least two first resistance structures, and
at least two second resistance structures respectively corresponding to positions of the at least two first resistance structures; and
wherein the first resistance structures and the second resistance structures are in the bending induction region, the first resistance structures are on one side of the flexible display panel, and the second resistance structures are on another one side of the flexible display panel.

5. The flexible display apparatus according to claim 4, wherein:
the first resistance structures are arranged in a direction intersecting a bending datum line of the flexible display panel, and two of the first resistance structures are respectively coupled with the power supply terminal and the bending sensor;
the second resistance structures are arranged in the direction intersecting the bending datum line of the flexible display panel, and two of the second resistance structures are respectively coupled with the power supply terminal and the bending sensor;
when the flexible display panel is in a flat state, adjacent first resistance structures are insulated from each other, and adjacent second resistance structures are insulated from each other;
when the flexible display panel is in a bent state, adjacent first resistance structures are in direct contact and are coupled; or, adjacent second resistance structures are in direct contact and are coupled; and
the bending sensor is configured to detect current signals of the first resistance structures or the second resistance structures, and determine the bending direction according to the current signals.

6. The flexible display apparatus according to claim 4, wherein the first resistance structures and the second resistance structures are each of a strip-shaped structure; and extension directions of the first resistance structures and the second resistance structures are both consistent with a direction of a bending datum line of the flexible display panel.

7. The flexible display apparatus according to claim 4, wherein:
a cross-sectional area of each of the first resistance structures gradually decreases in a direction perpendicular to the flexible display panel and away from the one side of the flexible display panel; and
a cross-sectional area of each of the second resistance structures gradually decreases in a direction perpendicular to the flexible display panel and away from the another one side of the flexible display panel.

8. The flexible display apparatus according to claim 4, wherein:
the first resistance structures are integrated into the flexible display panel, and the second resistance structures are attached to a surface of the flexible display panel; or
the second resistance structures are integrated into the flexible display panel, and the first resistance structures are attached to a surface of the flexible display panel.

9. The flexible display apparatus according to claim 4, wherein the first resistance structures, the second resistance structures, and the strain gauge are insulated from each other.

10. The flexible display apparatus according to claim 1, further comprising:
a flexible battery on a side, facing away from a display surface, of the flexible display panel.

11. The flexible display apparatus according to claim 10, further comprising:
a flexible shell;
wherein the flexible display panel and the flexible battery are inside the flexible shell.

12. The flexible display apparatus according to claim 1, wherein the processor is configured to:
compare a value of the bending information with a preset threshold;
determining the bending information is invalid bending information when the value of the bending information is less than the preset threshold; and
determining the bending information is the valid bending information when the value of the bending information is greater than the preset threshold.

13. The flexible display apparatus according to claim 1, wherein the processor is configured to:
determine the at least one application is an application matching a bending event, and the valid bending information meets a corresponding trigger condition; and
trigger the application to execute the corresponding operation.

14. A control method of a flexible display apparatus, wherein the flexible display apparatus comprises:
a flexible display panel;
a bending inductor, configured to sense bending information of the flexible display panel; and
a processor, coupled with the bending inductor, and configured to:
receive the bending information of the bending inductor,
determine whether the bending information is valid bending information, and control at least one application to execute a corresponding operation according to the valid bending information, when the bending information is determined to be the valid bending information;

wherein the bending information comprises a degree of bending;

the bending inductor comprises:
  at least one strain gauge in a bending induction region of the flexible display panel, and
  a bending sensor coupled with the at least one strain gauge;
  wherein one end of the strain gauge is coupled with a power supply terminal, and the other end of the strain gauge is coupled with the bending sensor; and
  the bending sensor is configured to:
    detect current signals of the strain gauge,
    determine the degree of bending according to the current signals, and
    output the bending information;

wherein the control method comprises:
  receiving bending information of the bending inductor; and
  determining whether the bending information is valid bending information;
  controlling at least one application to execute a corresponding operation according to the valid bending information, when the bending information is determined to be the valid bending information.

15. The control method according to claim 14, wherein said determining whether the bending information is valid bending information comprises:
  comparing a degree of bending in the bending information with a preset threshold;
  determining the bending information is invalid bending information when the degree of bending is less than the preset threshold; and
  determining the bending information is the valid bending information when the degree of bending is greater than the preset threshold.

16. The control method according to claim 14, wherein said controlling the at least one application to execute the corresponding operation according to the valid bending information comprises:
  determining the at least one application is an application matching a bending event, and the valid bending information meets a corresponding trigger condition; and
  trigging the at least one application to execute the corresponding operation.

17. A flexible display apparatus, comprising:
  a flexible display panel;
  a bending inductor, configured to sense bending information of the flexible display panel; and
  a processor, coupled with the bending inductor, and configured to:
    receive the bending information of the bending inductor,
    determine whether the bending information is valid bending information, and
    control at least one application to execute a corresponding operation according to the valid bending information, when the bending information is determined to be the valid bending information;
  wherein the processor is further configured to:
    determine the at least one application is an application matching a bending event, and the valid bending information meets a corresponding trigger condition; and
    trigger the application to execute the corresponding operation.

18. The flexible display apparatus according to claim 17, wherein the bending information comprises a degree of bending;
  the bending inductor comprises:
    at least one strain gauge in a bending induction region of the flexible display panel, and
    a bending sensor coupled with the at least one strain gauge;
    wherein one end of the strain gauge is coupled with a power supply terminal, and the other end of the strain gauge is coupled with the bending sensor; and
    the bending sensor is configured to:
      detect current signals of the strain gauge,
      determine the degree of bending according to the current signals, and
      output the bending information.

19. The flexible display apparatus according to claim 18, wherein the bending information further comprises a bending direction;
  the bending inductor further comprises:
    at least two first resistance structures, and
    at least two second resistance structures respectively corresponding to positions of the at least two first resistance structures; and
    wherein the first resistance structures and the second resistance structures are in the bending induction region, the first resistance structures are on one side of the flexible display panel, and the second resistance structures are on another one side of the flexible display panel.

20. The flexible display apparatus according to claim 19, wherein:
  the first resistance structures are arranged in a direction intersecting a bending datum line of the flexible display panel, and two of the first resistance structures are respectively coupled with the power supply terminal and the bending sensor;
  the second resistance structures are arranged in the direction intersecting the bending datum line of the flexible display panel, and two of the second resistance structures are respectively coupled with the power supply terminal and the bending sensor;
  when the flexible display panel is in a flat state, adjacent first resistance structures are insulated from each other, and adjacent second resistance structures are insulated from each other;
  when the flexible display panel is in a bent state, adjacent first resistance structures are in direct contact and are coupled; or, adjacent second resistance structures are in direct contact and are coupled; and
  the bending sensor is configured to detect current signals of the first resistance structures or the second resistance structures, and determine the bending direction according to the current signals.

* * * * *